United States Patent
Pang

(10) Patent No.: US 8,514,898 B1
(45) Date of Patent: Aug. 20, 2013

(54) METHODS AND APPARATUS FOR INCREASING WAVELENGTH TUNING SPEED IN BROADBAND MODE-LOCKED ULTRAFAST LASERS

(75) Inventor: H. Yang Pang, San Jose, CA (US)

(73) Assignee: Lighthouse Photonics, Inc., Sunnyvale, CA (US)

( * ) Notice: Subject to any disclaimer, the term of this patent is extended or adjusted under 35 U.S.C. 154(b) by 378 days.

(21) Appl. No.: 12/875,436

(22) Filed: Sep. 3, 2010

(51) Int. Cl.
  *H01S 3/10* (2006.01)
(52) U.S. Cl.
  USPC .............. 372/20; 372/18; 372/70; 372/100
(58) Field of Classification Search
  USPC ......................................................... 372/20
  See application file for complete search history.

(56) References Cited

U.S. PATENT DOCUMENTS

| | | | |
|---|---|---|---|
| 5,079,772 A | 1/1992 | Negus et al. | |
| 5,097,471 A | 3/1992 | Negus et al. | |
| 5,173,908 A | 12/1992 | Negus et al. | |
| 5,212,698 A | 5/1993 | Kafka et al. | |
| 5,307,358 A | 4/1994 | Sheps | |
| 5,365,366 A | 11/1994 | Kafka et al. | |
| 5,572,358 A | 11/1996 | Gabl et al. | |
| 5,799,025 A * | 8/1998 | Lai et al. | 372/18 |
| 5,815,519 A * | 9/1998 | Aoshima et al. | 372/25 |
| 5,847,861 A | 12/1998 | Kafka et al. | |
| 5,953,354 A | 9/1999 | Staver et al. | |
| 6,038,055 A | 3/2000 | Hansch et al. | |
| 6,288,832 B1 | 9/2001 | Richman et al. | |
| 6,560,269 B1 * | 5/2003 | Takehisa et al. | 372/103 |
| 6,594,301 B2 | 7/2003 | Pang | |
| 2005/0078730 A1 * | 4/2005 | Holsinger et al. | 372/70 |

OTHER PUBLICATIONS

Spectra-Physics, "Tsunami Mode-locked Ti:sapphire Laser User's Manual", Part No. 0000-232A, Rev. D, Jun. 2002.

* cited by examiner

*Primary Examiner* — Xinning Niu
(74) *Attorney, Agent, or Firm* — Jonathan A. Small

(57) ABSTRACT

A wavelength-tunable, ultrafast laser includes a resonator having an optically-pumped gain-medium. The resonator includes a pair of group-delay-dispersion compensating prisms and a bandwidth limiting stop. Both prisms and stop are fixed in a predetermined position relative to one another. In one embodiment, a movable beam shifting reflector is placed between the prisms. The reflector shifts the dispersed beam with respect to the second prism and the stop. The stop is arranged, cooperative with the second prism, to select a pulse wavelength within the gain-bandwidth. Tuning of the selected pulse-wavelength is accomplished by translating the beam shifting reflector. Alternatively, a two-reflector arrangement may also select pulse-wavelengths, accomplished by a combination of rotation and translation of the two reflectors. Reflector motion is controlled relative to the positions of prisms and stop such that all selected lasing wavelengths result in minimized change in laser output pulse width as the laser wavelength is tuned.

7 Claims, 7 Drawing Sheets

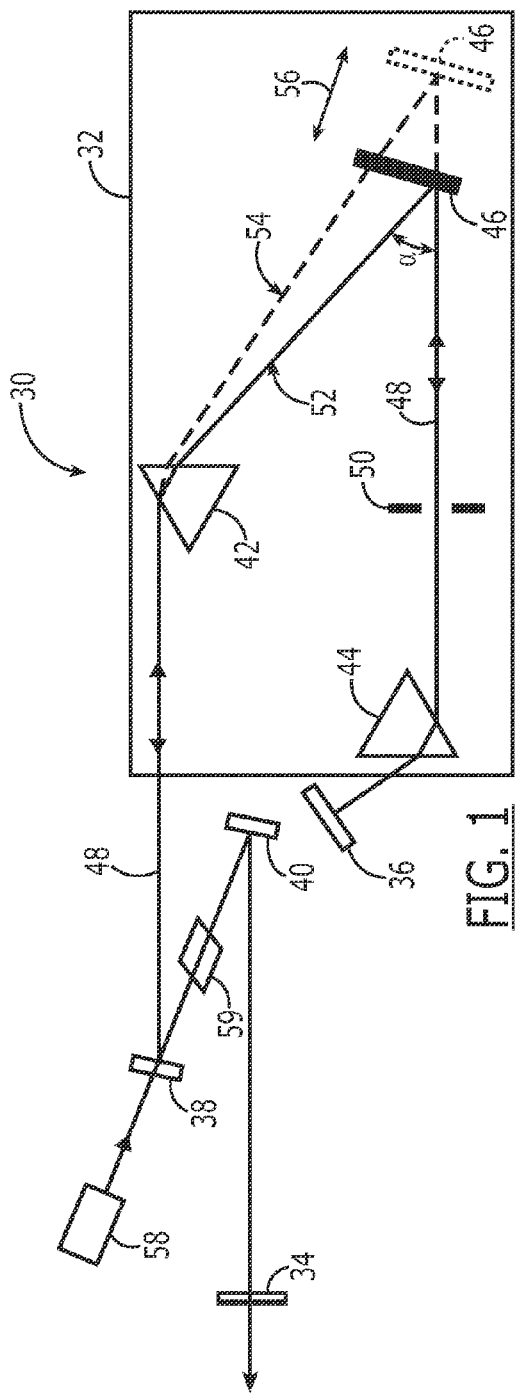
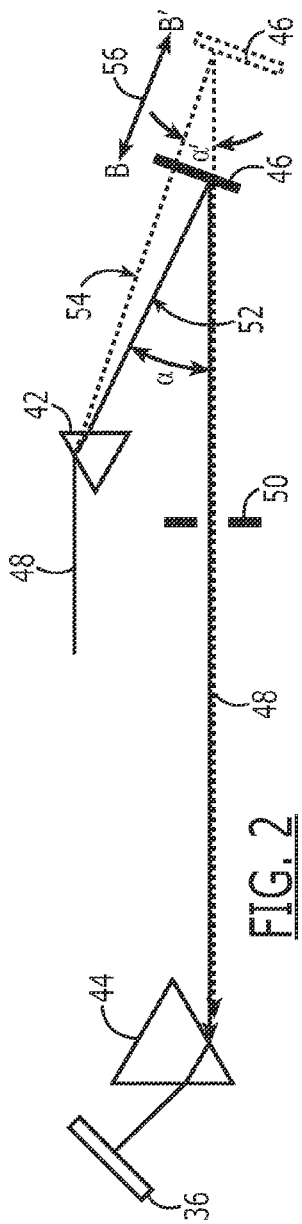

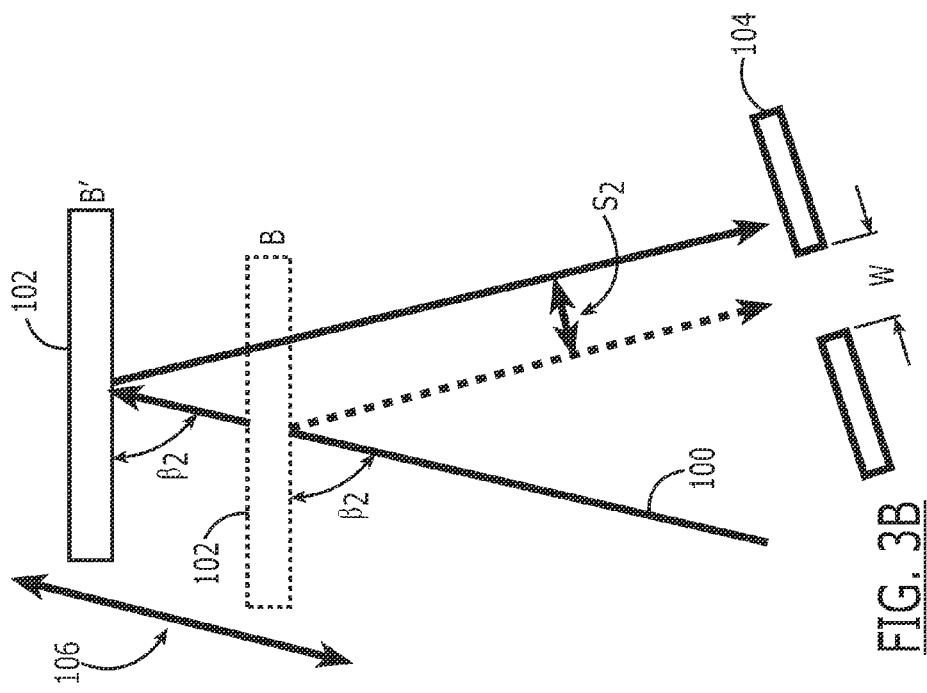
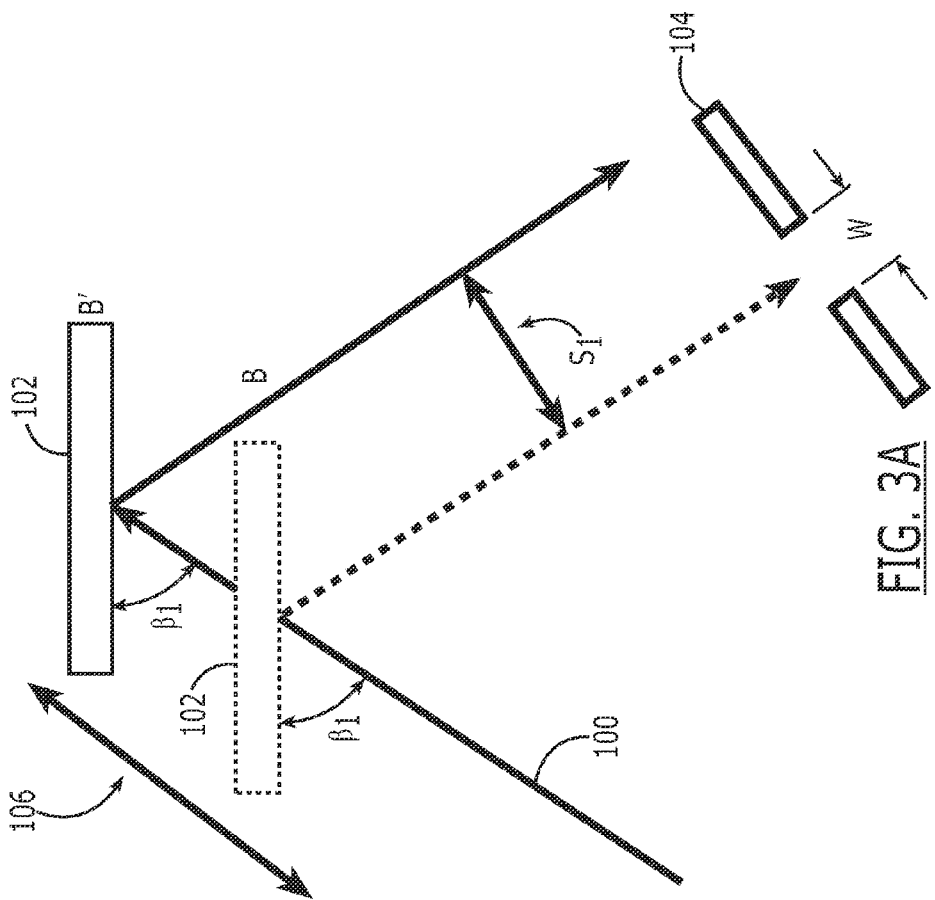

METHODS AND APPARATUS FOR INCREASING WAVELENGTH TUNING SPEED IN BROADBAND MODE-LOCKED ULTRAFAST LASERS

BACKGROUND

The present disclosure relates in general to tunable ultrafast lasers, and more specifically, to fast, automatic wavelength tuning of mode-locked ultrafast lasers while minimizing changes in pulse characteristics thereof.

Mode-locked ultrafast lasers employing a solid-state gain medium such as Ti:sapphire can be tuned over a relatively wide range of wavelengths, from about 700 nanometers (nm) to about 1000 nm. The broad wavelength tuning range and the mode-locked, ultra-short pulses delivered by such lasers find application in spectroscopy, biology, and other scientific research and commercial applications.

Tuning of an ultrafast Ti:sapphire lasers to the full wavelength range has historically presented a number of technical challenges. For example, adjustable wavelength selective devices, such as birefringent filters (BRFs), have been introduced into the laser cavity or optical path. However, the interplay of intra-cavity peak power, gain variation in different wavelength ranges, and intra-cavity dispersion that affect the laser pulse characteristics result in complex, multiple-element laser wavelength tuning. Among the elements that must be simultaneously controlled to provide wavelength selection are adjustable wavelength selective device control, pump power control, etc. This complex and dynamic control problem has hindered the wider use of wavelength adjustable ultrafast lasers.

Various designs have been proposed to provide improved wavelength tuning of a mode-locked ultrafast laser. One example of such a proposal is illustrated in FIGS. 6 and 7, which schematically depict a tunable mode-locked laser resonator 20. With reference to FIG. 6, laser resonator 20 comprises a dispersion compensation portion 10 formed between a partially transmitting, output coupling mirror 11 and a maximum reflecting mirror 18. Fold mirrors 25 and 26 serve to compact the physical size of laser resonator 20, while still allowing a relatively long optical path length in the resonator, for example, an optical path length of over 100 cm or greater between terminating mirrors 11 and 18 of the resonator.

The wavelength tuning method in the laser resonator is illustrated with reference to the apparatus shown in FIG. 7. When the non-dispersed laser beam 22 passes the first prism 13, wavelength dependent divergence occurs, separating the wavelength content of the resonating beam 22 to the short wavelength 15 on one side and the long wavelength 16 on the other side. The wavelength selecting stop 17 is placed in the laser beam dispersed region after the second prism 14 to allow a selected wavelength, shown by beam 27 for example, to oscillate (i.e., pass through stop 17, reflect off mirror 18 and back through stop 17, through prism 14 then 13, and so on), so as to achieve wavelength tuning. To achieve proper wavelength tuning with well-balanced pulse width from the laser, the second prism 14 has to be translated along the direction indicated by arrow 19. Meanwhile, the position of stop 17 must also be adjusted, along the direction of arrow 24, to ensure proper dispersion for the oscillating wavelength. To complicate the matter further, the width of stop 17 must also be adjusted when the wavelength is varied across the tuning range. The complexity in wavelength tuning with this conventional configuration represents significant disadvantage for ease of manufacturing of the laser and user experience.

Development of a single-element control in place of the multi-element approach has enabled improved control and ease of use in wavelength selection. An example of such a single-element control is disclosed in U.S. Pat. No. 6,594,301, incorporated herein by reference, and generally illustrated in FIG. 8. The laser apparatus is arranged similar to laser resonator 20 of FIG. 6. When the non-dispersed part of the laser beam in the resonator 10 passes through first prism 13 toward second prism 14, wavelength dependent divergence occurs, separating the spectral content of the resonating beam to the short wavelength 15 on one side and the long wavelength 16 on the other side. The wavelength selecting stop 17 is placed in the laser beam dispersed region after second prism 14 in a fixed positional relationship with the second prism. When the second prism and the stop move together along the translation direction 29, a selected wavelength, shown by beam 28 for example, is allowed to oscillate, so as to achieve the wavelength tuning.

The advantage in comparison to the prior approach in FIGS. 6 and 7 is that the control of tuning is reduced to a single-element adjustment—the translation in the direction of arrow 29. Therefore, the manufacturing and use complexity is significantly reduced.

However, one shortcoming of even single-element control is the slow speed of wavelength tuning. For many applications, such as the dynamic studies of some live tissues, the speed of wavelength tuning remains a fundamental problem because the time it takes (tens of seconds) to tune from one wavelength to the other is not fast enough to resolve the physical phenomena of interest.

The slow tuning speed is a result of the inertia and momentum of the motion control subsystem. In the aforementioned U.S. Pat. No. 6,594,301, for example, the motion control subsystem (prism and stop positioning system) includes relatively large, heavy elements such as one or more prisms, stops, and a carriage to support these elements in a precise position relative to one another. Adjustment of wavelength requires precisely and rapidly moving this assembly. The inertia of the mass, and momentum while the subsystem is moving, prevents simultaneous fast motion and precise positioning for wavelength selection at high speed. Neither speed nor accuracy is optimized. Thus, there is a need for an ultrafast laser wavelength tuning mechanism in which not only a simple scheme is applied suitable for automatically controlled operation, but also a faster mechanism to enable high speed tuning of the laser wavelength.

SUMMARY

Accordingly, the present disclosure is directed to systems having a lower mass wavelength tuning subsystem, and methods of operating same, which provide increased speed and accuracy of wavelength tuning of a broadband ultrafast laser.

According to one embodiment, a pair of prisms is located in a laser resonator and arranged to provide group velocity dispersion compensation. At a defined location between the prism pair and after the second prism, spatial spread of the lasing spectrum content is established. A bandwidth-limiting stop is placed in the dispersed region of the lasing spectrum to limit the lasing bandwidth and the separation of the prisms is arranged for a desired dispersion suitable to the desired pulse width.

Both first and second prisms are fixed and the wavelength tuning stop is also kept fixed relative to the position of the second prism. A lightweight beam shifting reflector or reflector pair is introduced between the fixed the prism pair. When the beam shifting reflector is moved along the propagation direction of the laser radiation from the first prism, the spatial relationship can be changed such that the laser wavelength is varied and pulses of different wavelengths within the gain-bandwidth, in passing through the prisms, are adjusted to experience different amounts of dispersion in the resonator. Therefore, wavelength tuning and dispersion compensation adjustment to different wavelengths can be achieved by moving only the beam-shifting reflector. Due to the low mass of the moving parts applied in this configuration, motion control mechanisms such as a voice coil actuator or galvanometer can be employed to significantly increase the wavelength tuning speed. A speed increase by a factor of 10 to 100 from known configurations is possible.

The folding angle of the beam-shifting reflector determines the amount of lateral shift of the spatially dispersed spectrum. One advantage of this tuning mechanism is that the angle of reflection can be varied to provide the desired tuning resolution and desired group velocity dispersion balance across the gain bandwidth. The angle of reflection of the beam shifting reflector is set such that desired position shift of the spatially spread spectrum is configured in the resonator relative to the second prism to limit the different optical paths possible in the resonator such that only those of the pulses having a selected center wavelength can circulate in the resonator. The spatial relationship of the beam shift relative to the second prism is selected such that the circulating pulses follow a predetermined optical path-length therein in order to obtain an adequate amount of dispersion compensation.

An arrangement is provided for moving at least one beam-shifting reflector relative to the second prism to create the spectral shift for varying the selected center wavelength of the pulses within the gain-bandwidth. The movement is limited such that a predetermined angle of reflection minimizes the amount of motion but maximizes the balance of the laser pulse width across the entire laser bandwidth as different pulse center wavelengths are selected by the reflector motion. When the reflector is translated along the laser beam propagation direction, a very small reflector can be used to minimize the moving mass.

In one embodiment of the invention there are two fixed prisms. The first prism is arranged such that it initiates the intra-cavity beam dispersion via refraction and forms the wavelength dependent diverging ray of laser radiation toward the second prism. When the lasing beam from the first prism reaches the second prism via said beam shifting reflector, it is spatially separated within the laser gain bandwidth with the short wavelength on one side and the long wavelength on the other side. A bandwidth limiting stop is maintained in a fixed positional relationship with respect to the second prism, the relationship being such that when the beam shifting reflector is translated along the propagation direction of the laser radiation from the first prism, the lasing wavelength is selected thereby.

The above is a summary of a number of the unique aspects, features, and advantages of the present disclosure. However, this summary is not exhaustive. Thus, these and other aspects, features, and advantages of the present disclosure will become more apparent from the following detailed description and the appended drawings, when considered in light of the claims provided herein.

BRIEF DESCRIPTION OF THE DRAWINGS

In the drawings appended hereto like reference numerals denote like elements between the various drawings. While illustrative, the drawings are not drawn to scale. In the drawings:

FIG. 1 is a schematic illustration of a first embodiment of a pulsed, tunable, mode-locked laser in accordance with the present invention, having a resonator including two dispersion-compensating prisms, a lasing bandwidth limiting stop, and a movable beam shifting reflector placed between the prisms.

FIG. 2 is a schematic illustration of the laser beam shift introduced by linearly translating the reflector and the amount of beam shift as a function of angle of reflection and of the translation distance for a pulsed, tunable, mode-locked laser such as that illustrated in FIG. 1.

FIG. 3 is a more detailed schematic illustration of the laser beam shift introduced by linearly translating the reflector and the amount of beam shift for a pulsed, tunable, mode-locked laser such as that illustrated in FIG. 1.

DETAILED DESCRIPTION

Figure 4:
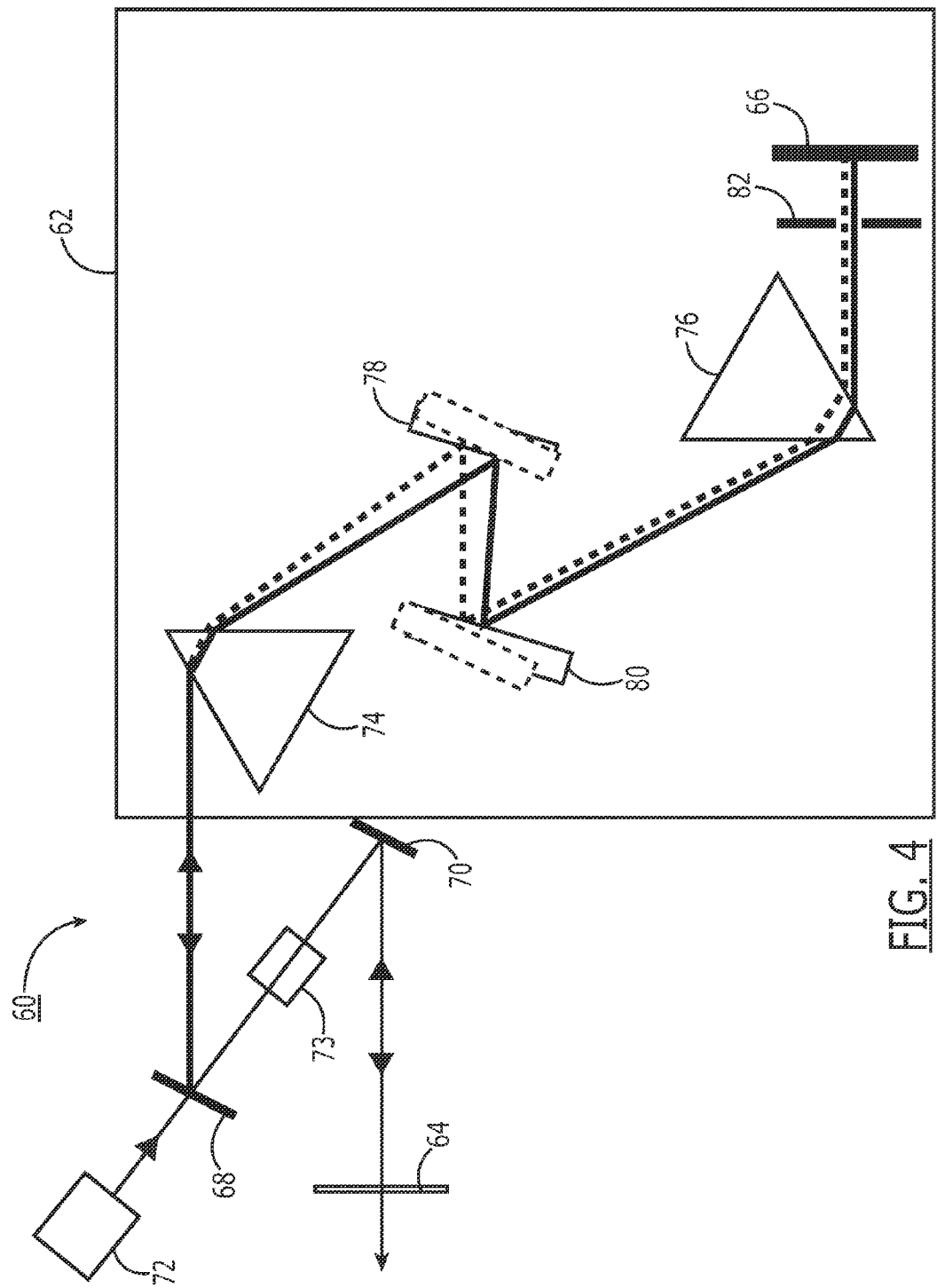
FIG. 4 is a schematic illustration of a second embodiment of a pulsed, tunable, mode-locked laser in accordance with the present invention, having a resonator including two dispersion-compensating prisms, a lasing bandwidth limiting stop, and a pair of rotating, parallel folding reflectors placed between the prisms.

We initially point out that descriptions of well-known starting materials, processing techniques, components, equipment and other well-known details are merely summarized or are omitted so as not to unnecessarily obscure the details of the present invention. Thus, where details are otherwise well known, we leave it to the application of the present invention to suggest or dictate choices relating to those details.

With reference now to FIG. 1, there is shown therein a tunable mode-locked laser 30 in accordance with one embodiment of the present disclosure. Laser 30 includes a dispersion compensation portion 32 formed between a partially transmitting output coupling mirror 34 and a maximum reflecting mirror 36. Fold mirrors 38 and 40 serve to compact the physical size of laser 30, while still allowing a relatively long optical path length in the resonator, for example, an optical path length of over 100 cm or greater between terminating mirrors 34 and 36 of the resonator. A suitable laser source 58, for example a diode-pumped frequency-doubled Nd:YAG or Nd:YVO$_4$ laser delivering at a wavelength of 532 nm, is disposed for introducing a light beam through fold mirror 38. A gain medium 59, for example Ti:Al$_2$O$_3$, is disposed, for example, between fold mirrors 38, 40.

As will be readily understood by one skilled in the art, group-delay dispersion compensation is necessary for this type of mode-locked ultra-fast laser, and is provided by prisms 42 and 44, located in dispersion compensation portion 32. The general dispersion compensation technique is described in the aforementioned U.S. Pat. No. 6,594,301. In this embodiment of the present disclosure, a beam shifting reflector 46 intercepts a dispersed laser beam 48 oscillating in dispersion compensation portion 32 following first prism 42 and folds the beam with a predetermined angle α toward the second prism 44.

This beam folding configuration does not alter the dispersion compensation characteristics of the two prisms 42 and 44 in dispersion compensation portion 32. However, in accordance with an intra-cavity wavelength selection stop 50 and the motion of folding reflector 46, the laser oscillating wavelength can be varied as illustrated in the more detailed schematic illustration of FIG. 2. Prisms 42, 44 as well as wavelength selecting stop 50 are all in predetermined, fixed positions relative to one another. The beam shifting reflector 46 is placed to reflect the beam from first prism 42 toward second prism 44 through wavelength selecting stop 50, placed after the reflector 46. When the reflector is at position B, beam 48 is reflected at angle α toward second prism 44, and the shorter wavelength part of the spread spectral content, indicated by beam 52 is transmitted through stop 50 and allowed to oscillate in the laser resonator. When reflector 46 is re-positioned to position B', beam 48 is reflected at angle α' toward second prism 44, and the longer wavelength part of the spectral content 54 is transmitted through stop 50 and allowed to oscillate in the laser resonator. Therefore, when the reflector is translated along the direction indicated by arrow 56, selection of a center wavelength form among the available center wavelengths comprising the gain bandwidth (i.e., laser wavelength tuning) is accomplished. The translation distance also allows the amount of group dispersion delay to vary so as to balance the desired quantity of dispersion for various wavelengths oscillating therein.

It will be appreciated that the structural arrangement discussed above is merely one embodiment, and that many variations and alternatives are within the scope of this disclosure. For example, while stop 50 is shown located between second prism 44 and reflector 46, it may in fact be placed anywhere the intra-cavity beam is spectrally dispersed to serve the same purpose, such as between the second prism 44 and the end mirror 36.

The resolution of wavelength selectivity provided by the disclosure above may be controlled to a certain extent by the angle of incidence of beam 48 on reflector 46 (FIG. 1). This is generally illustrated by FIGS. 3A and 3B. With reference first to FIG. 3A, an input beam 100 is incident on reflector 102 at a first angle $\beta_1$ when reflector 102 is in position B. In position B, the reflection of beam 100 from reflector 102 is transmitted through stop 104. When reflector 102 is re-positioned to position B', along the path indicated by arrow 106, the reflection of beam 100 by reflector 102 remains incident on reflector 102 at angle $\beta_1$, however the position of reflected beam 100 shifts such that it is blocked by stop 50. The distance $S_1$ shows the spacing between the reflected beams upon movement of reflector 102. This general description can be extended to the dispersed center wavelength of the pulses within the gain-bandwidth for each of the short and long wavelengths. Wavelength selection can thereby be enabled.

With reference to FIG. 3B, beam 100 is now incident on reflector 102 at a second angle $\beta_2$, where $\beta_1 < \beta_2$. As before, reflected beam 100 is transmitted through stop 104. When reflector 102 moves from position B to position B', along the path indicated by arrow 106, beam 100 remains incident on reflector 102 at angle $\beta_2$, and the reflection of beam 100 is blocked by stop 104. In this embodiment, however, the spacing between beam centers is $S_2$, where $S_1 > S_2$. This means that for a fixed stop opening width, w, and a fixed position of stop 104, the greater the angle of incidence (i.e., larger β), the less reflector 102 needs to move to tune the full gain-bandwidth. Conversely, for precise wavelength control it may be desirable that the angle of incidence be relatively small. However, a smaller angle of incidence requires a larger physical movement of reflector 102 between positions B and B' and hence a large apparatus, slower tuning time, etc.

A number of advantages of the embodiments provided by this disclosure are therefore apparent. First, a very thin and lightweight reflector can be used to dramatically reduce the mass in motion. Therefore, high-speed actuators such as a DC motor, stepper motor, voice coil-driven actuator, or galvanometer-driven actuator can be employed in the mechanical motion-based wavelength tuning control subsystem to greatly increase the tuning speed. Second, the additional variable of angle of reflection of the folding reflector gives an additional optimization parameter for the laser tuning resolution, as illustrated in FIGS. 3A and 3B and discussed above. Third, the reflector translation physical distance provides balance of dispersion compensation between short and long wavelengths so that the pulse width change between short and long wavelength is minimized. Fourth, the folding mirror reduces the physical motion of the mechanism by a factor of about two for the same amount of dispersion compensation balance compared to translating the prism-stop assembly, such as taught in U.S. Pat. No. 6,594,301. This further increases the motion control speed for faster wavelength tuning of the laser.

With reference next to FIG. 4, there is shown therein a schematic illustration of another embodiment of a tunable mode-locked ultra-fast laser 60 according to the present disclosure. Laser 60 includes a dispersion compensation portion 32 formed between a partially transmitting, output coupling mirror 64 and a maximum reflecting mirror 66. Dispersion compensation portion 32 includes a wavelength tuning control subsystem, described in further detail below. Fold mirrors 68, 70 serve to compact the physical size of laser 60, while still allowing a relatively long optical path length in resonator 62, for example, an optical path length of 100 cm or greater between terminating mirrors 64, 66. A suitable laser source 72, for example a diode-pumped frequency-doubled Nd:YAG or Nd:YVO4 laser delivering at a wavelength of 532 nm, is disposed for introducing a light beam through fold mirror 68. A gain medium 73, for example Ti:Al$_2$O$_3$, is disposed, for example, between fold mirrors 68, 70.

The group-delay dispersion compensation for mode-locked ultra-fast laser 60 is provided by prisms 74,76 located in resonator 62. In this embodiment, a pair of rotating, parallel folding reflectors 78, 80 intercepts the dispersed laser beam oscillating in dispersion compensation portion 32 from first prism 74 and folds the beam toward second prism 76. This beam folding configuration does not alter the dispersion compensation characteristics of the two prisms 74, 76 in dispersion compensation portion 32. However, in accordance with an intra-cavity wavelength selection stop 82 and the rotation about the axis of folding reflector 78, the laser oscillating wavelength can be varied.

Figure 5:
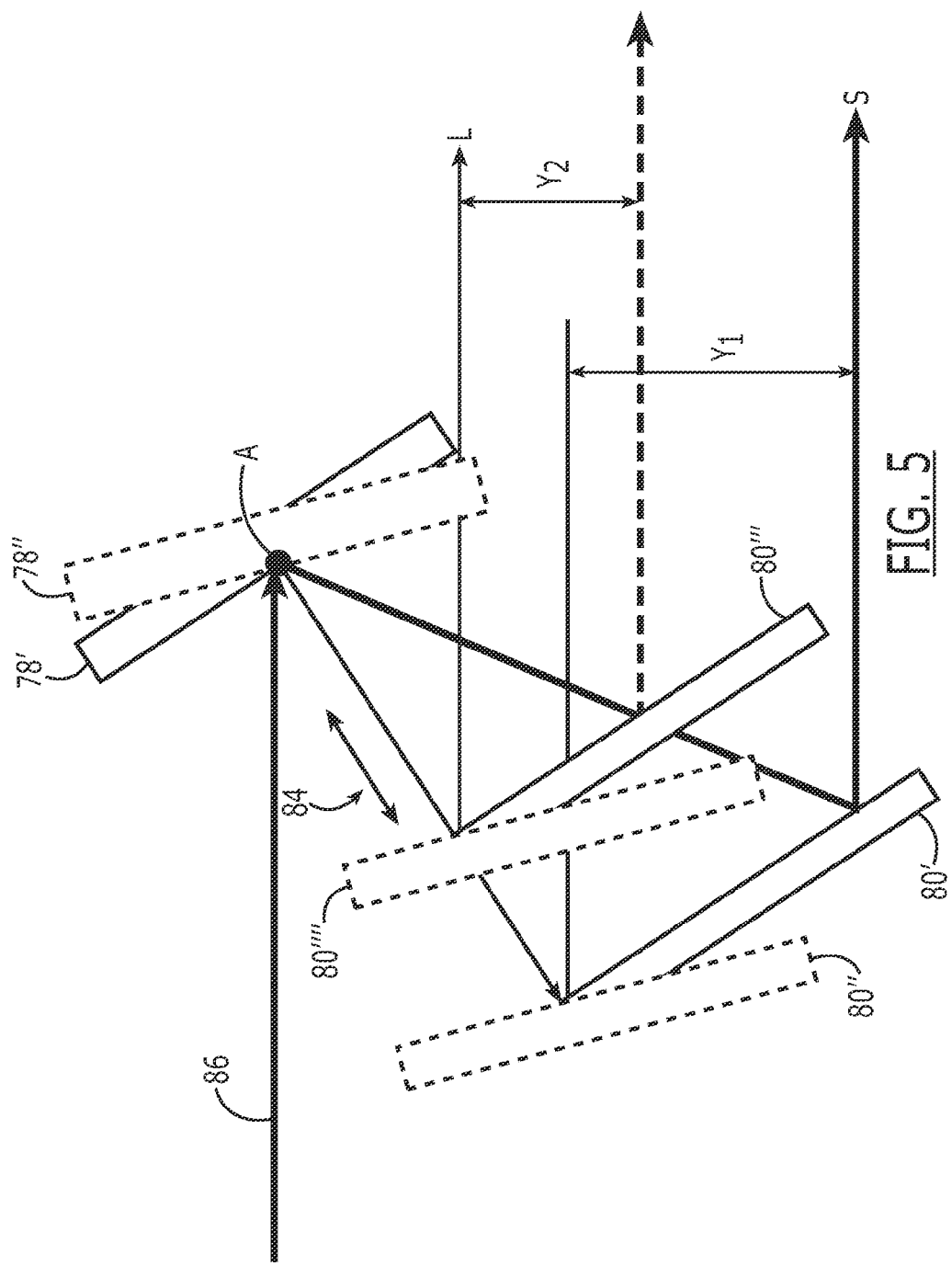
FIG. 5 is a schematic illustration of the laser beam shift introduced by rotating the parallel folding reflectors, including translation of one of the reflectors, and the amount of the beam shift dependence on rotation angle and translation.
Figure 6:
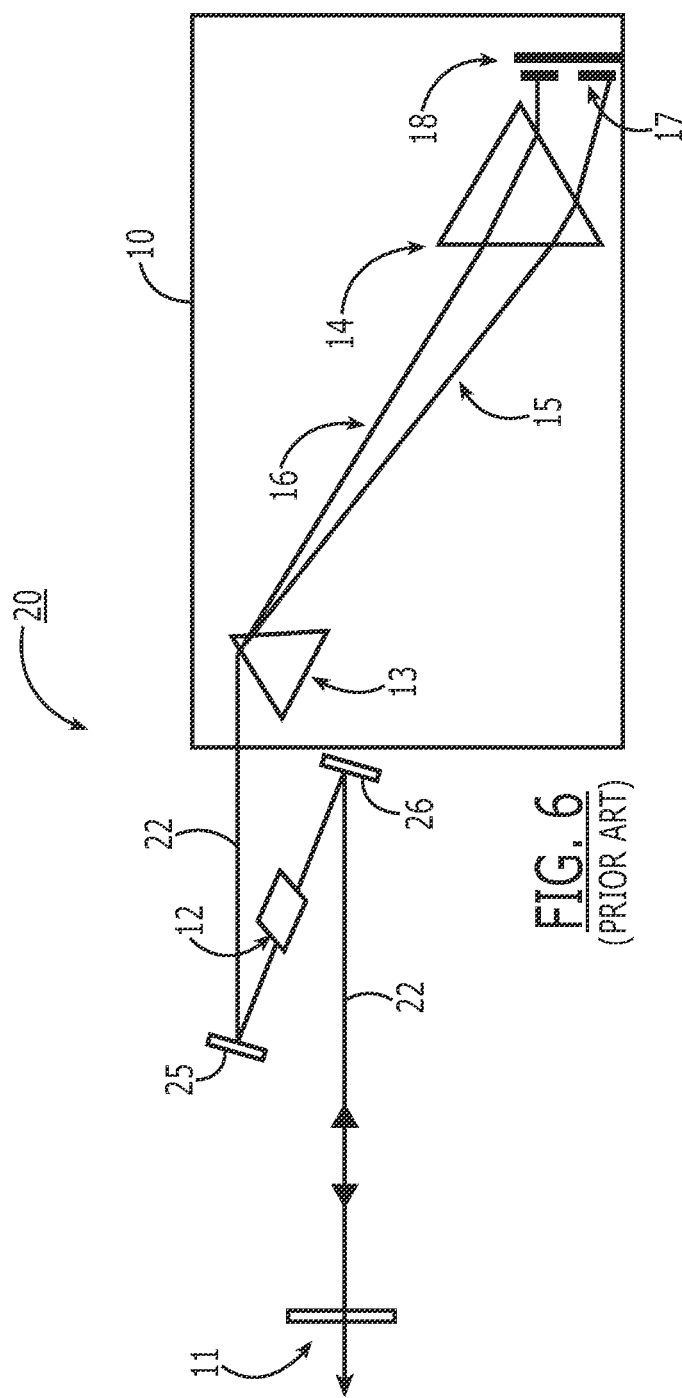
FIGS. 6 and 7 are schematic illustrations of a component configuration of a wavelength tuning scheme in a pulsed, tunable mode-locked laser according to one embodiment known in the art.
Figure 7:
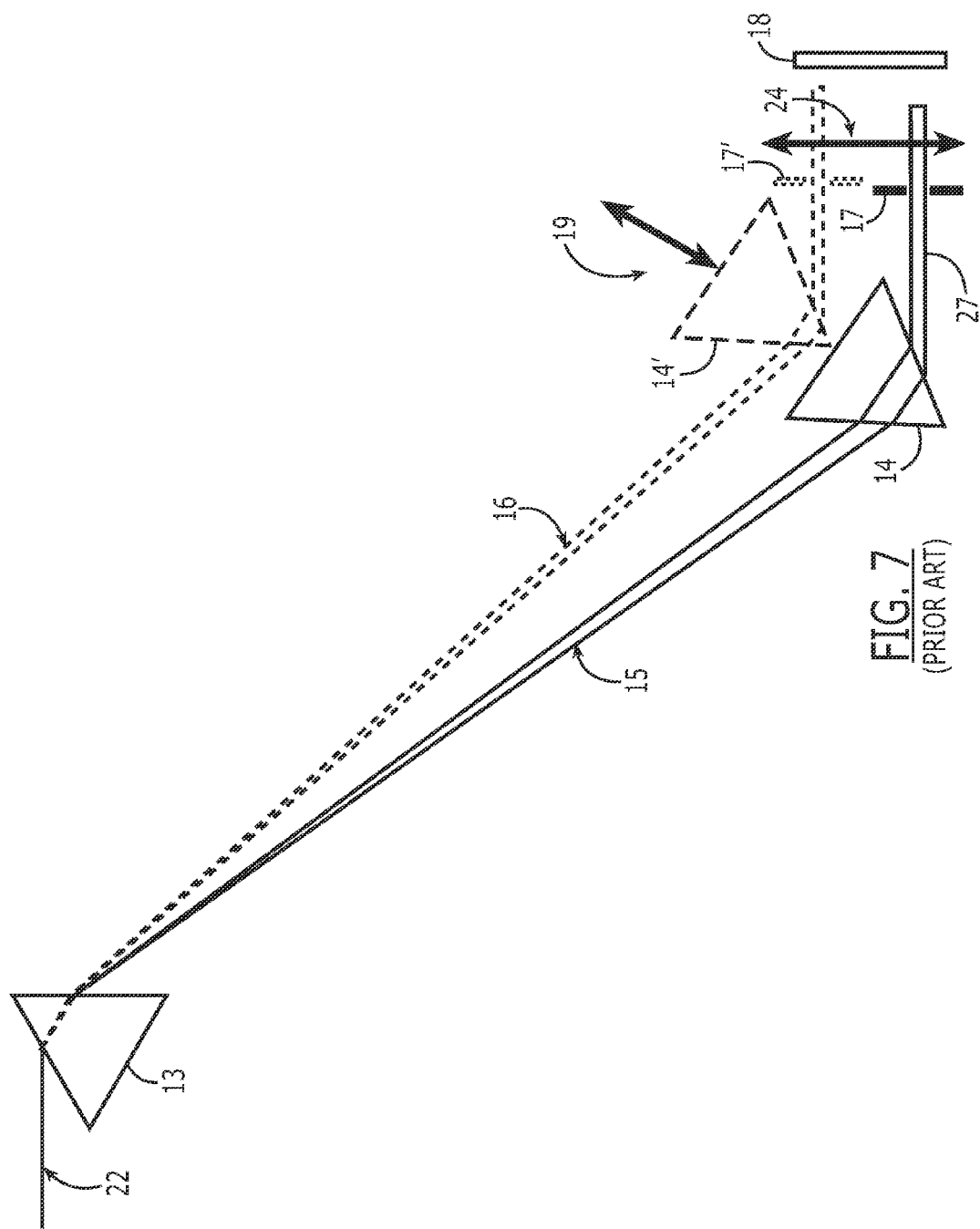
Figure 8:
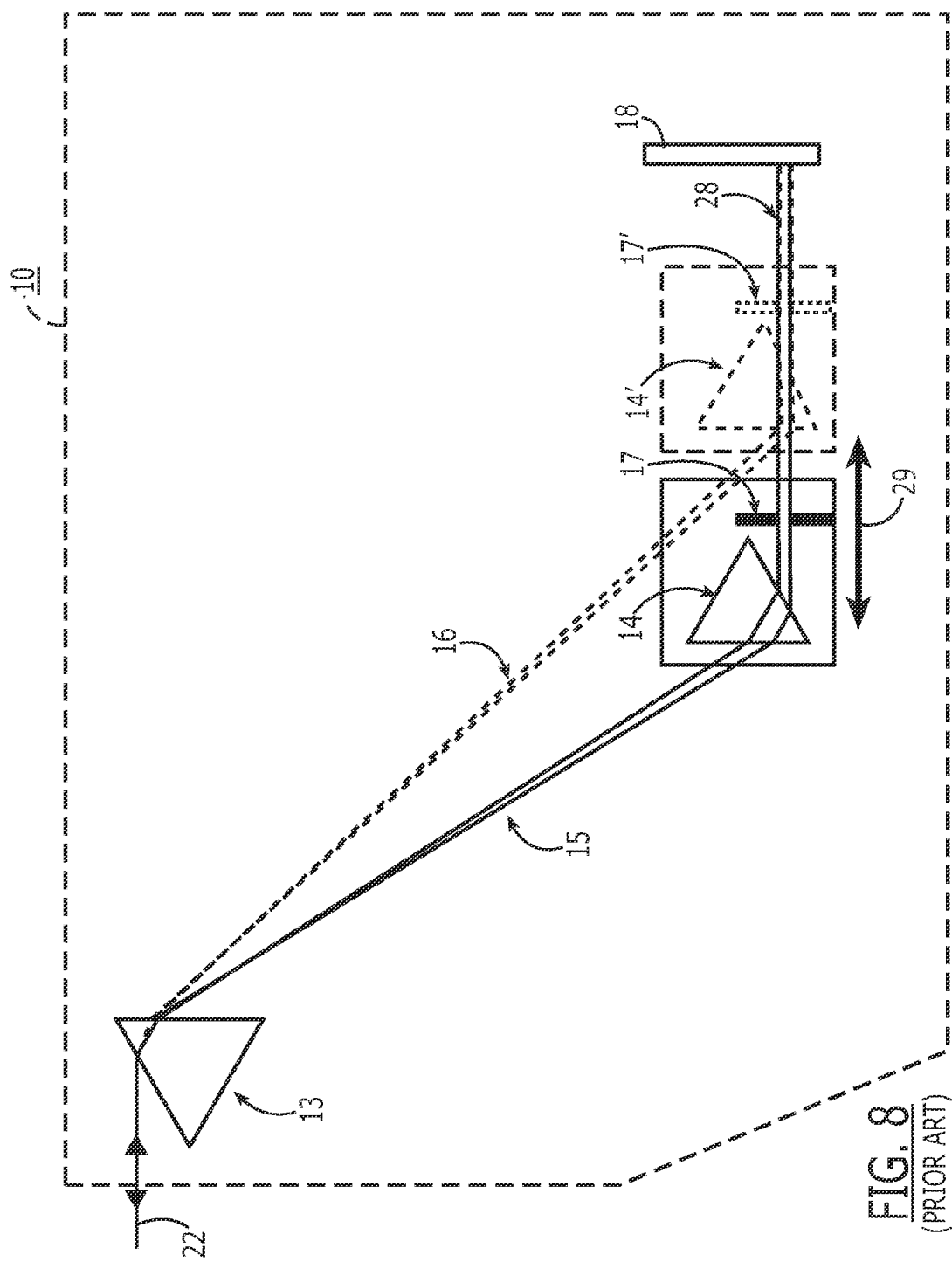
FIG. 8 is a schematic illustration a component configuration of a wavelength tuning scheme in a pulsed, tunable mode-locked laser according to another embodiment known in the art.

With reference to FIG. 5, the motion of rotating, parallel folding reflectors 78, 80 are illustrated in more detail. Initially, prisms 74, 76, wavelength selecting stop 82 (FIG. 4) are each fixed in position relative to one another. Folding reflector 78 is initially at position 78' and is disposed for controllable rotation about an axis A to a position 78". Folding reflector 80 is initially at position 80' and is disposed for controllable rotation about axis A, to position 80", to introduce an output beam shift by an amount $Y_1$. Axis A is in one embodiment located at the front face of first folding reflector 78, as shown in FIG. 5. However, axis A may also be located at other positions, such as at a position somewhere between (but other than at the midpoint between) first and second folding reflectors 78, 80. Folding reflector 80 is also disposed for controllable translation in the direction of arrow 84. The position of folding reflector 80 translated before rotation is indicated as position 80''', and the position of folding reflector 80 following translation and rotation is indicated as position 80''''. Rotating folding reflector 80 from position 80''' to position 80'''' introduces an output beam shift by an amount $Y_2$.

With folding reflector 78 initially at position 78', and folding reflector 80 initially at position 80', the shorter wavelength part, S, of spread spectral content 86 (exiting first prism 74) is transmitted through stop 82 and allowed to oscillate in the laser resonator. Following rotation of folding reflector 78 to position 78'' and rotation and translation of folding reflector 80 to position 80'''', the longer wavelength part, L, of spectral content 86 is transmitted through stop 82 and allowed to oscillate in the laser resonator. As described above with regard to FIG. 3, the parallel beam shift in the dispersed spectral region in between the two dispersion prisms 74, 76 is necessary for laser wavelength tuning.

One advantage of the embodiment illustrated in FIGS. 4 and 5 is that higher speed of tuning can be achieved, for example by employing a galvanometer to control the motion of rotating folding reflectors 78, 80. With weight balance, the speed of wavelength tuning can be further increased. Another advantage comes with the separation of wavelength tuning via reflector pair rotation, and dispersion control via reflector 80 linear translation. The translation of reflector 80 allows for arbitrary dispersion variations for each wavelength to which the laser is tuned. For some applications, this is a desirable feature. For example, this enables tuning to a wavelength then varying the pulse-width through dispersion control.

Accordingly, systems having a lower mass wavelength tuning subsystem, and methods of operating same, have been disclosed which provide increased speed and accuracy of wavelength tuning of a broadband ultrafast laser. Faster motion from one tuning position to the next is provided due to the low mass of the motion-based wavelength tuning control subsystem. Faster and more accurate stops at a tuning position are provided due to lower momentum. And finer granularity of resolution is provide by the use of an analog motion control device (with no "step" limiting adjustment resolution).

The physics of modern mechanical and electrical devices and the methods of their production are not absolutes, but rather statistical efforts to produce a desired device and/or result. Accordingly, no limitation in the description of the present disclosure or its claims can or should be read as absolute. The limitations of the claims are intended to define the boundaries of the present disclosure, up to and including those limitations. To further highlight this, the term "substantially" may occasionally be used herein in association with a claim limitation (although consideration for variations and imperfections is not restricted to only those limitations used with that term). While as difficult to precisely define as the limitations of the present disclosure themselves, we intend that this term be interpreted as "to a large extent", "as nearly as practicable", "within technical limitations", and the like.

Furthermore, while a plurality of exemplary embodiments have been presented in the foregoing detailed description, it should be understood that a vast number of variations exist, and these preferred exemplary embodiments are merely representative examples, and are not intended to limit the scope, applicability or configuration of the disclosure in any way. Various of the above-disclosed and other features and functions, or alternative thereof, may be desirably combined into many other different systems or applications. Various presently unforeseen or unanticipated alternatives, modifications, variations, or improvements therein or thereon may be subsequently made by those skilled in the art which are also intended to be encompassed by the claims, below.

Therefore, the foregoing description provides those of ordinary skill in the art with a convenient guide for implementation of the disclosure, and contemplates that various changes in the functions and arrangements of the described embodiments may be made without departing from the spirit and scope of the disclosure defined by the claims thereto.

What is claimed is:

1. A motion-based wavelength tuning control subsystem for a tunable mode-locked laser, comprising:
    a first prism located in an output path of an optical gain medium, said first prism producing from said output of said optical gain medium a plurality of wavelength-dependent diverging optical paths;
    a second prism disposed for receiving said plurality of wavelength-dependent diverging optical paths;
    a stop defining a stop opening, said stop positioned between said first and second prisms and in a fixed positional relationship with said first and second prisms, said stop opening positioned such that optical output from said first prism may pass through said opening and thereafter be incident upon said second prism, said opening sized to permit a desired bandwidth around a central wavelength within said plurality of wavelength-dependent diverging optical paths to be transmitted thereby; and
    a first moveable beam-shifting reflector disposed between said first prism and said stop, movement of said first moveable beam-shifting reflector determining which bandwidth within said plurality of wavelength-dependent diverging optical paths is transmitted by said stop to said second prism.

2. The motion-based wavelength tuning control subsystem of claim 1, wherein said motion of said first moveable beam-shifting reflector is linear translation in a direction substantially parallel to said wavelength-dependent diverging optical paths.

3. The motion-based wavelength tuning control subsystem of claim 2, wherein said translation of said first moveable beam-shifting reflector along said wavelength-dependent diverging optical paths further balances group dispersion delay among the wavelength-dependent diverging paths.

4. The motion-based wavelength tuning control subsystem of claim 2, further comprising an actuator for producing said translation of said first moveable beam-shifting reflector, said actuator selected from the group consisting of: DC motor, stepper motor, voice coil, and galvanometer.

5. A laser, comprising:
    a laser resonator formed between first and second mirrors;
    a gain-medium located in said laser resonator, said gain-medium, when energized, providing optical gain over a band of wavelengths characteristic of said gain-medium, said band of wavelengths defined as a gain-bandwidth;
    an optical pump arranged to energize said gain-medium, causing laser radiation to circulate within said laser resonator;
    said laser resonator arranged such that said laser radiation circulates as a sequence of pulses, each pulse having a center wavelength;
    first and second prisms located in said laser resonator between said gain-medium and said second mirror;
    said first prism being positioned to receive laser radiation from said gain-medium and disperse said radiation along wavelength-dependent diverging paths, and said second prism positioned to intercept radiation dispersed by said first prism;

a stop, defining a stop opening, mounted in a fixed spatial relationship with said first and second prisms and positioned with respect to said second prism such that said intercepted laser radiation can pass through said second prism in only a predetermined fixed region thereof, thereby defining a limited range of center wavelengths within said gain bandwidth of said gain-medium that can circulate in said resonator; and a movable beam-shifting reflector disposed between said first prism and said second prism for varying spectral and positional relationships of said wavelength-dependent diverging paths relative to said stop opening, thereby selecting a center wavelength from among the range of center wavelengths for circulation in said resonator.

6. The laser of claim 5, wherein said beam-shifting reflector is translated along a direction of propagation of said diverging beam path from said first prism with a predetermined angle of reflection to said stop, said translation resulting in different pulse center wavelengths being transmitted by said stop opening.

7. The laser of claim 6, further comprising an actuator for producing said translation of said reflector, said actuator selected from the group consisting of: DC motor, stepper motor, voice coil, and galvanometer.

* * * * *